(12) United States Patent
Saviano et al.

(10) Patent No.: US 6,435,127 B1
(45) Date of Patent: Aug. 20, 2002

(54) FLEXIBLE STRUCTURAL BARRIER

(76) Inventors: Leora H Saviano; Paul G Saviano, both of 1 Hillcrest Pl., Norwalk, CT (US) 06850

( * ) Notice: Subject to any disclaimer, the term of this patent is extended or adjusted under 35 U.S.C. 154(b) by 0 days.

(21) Appl. No.: 09/421,266

(22) Filed: Oct. 20, 1999

Related U.S. Application Data

(60) Provisional application No. 60/105,095, filed on Oct. 21, 1998.

(51) Int. Cl.$^7$ ................................................ B60Q 1/26
(52) U.S. Cl. ................... 116/28 R; 116/39; 116/DIG. 8
(58) Field of Search ............................ 116/28 R, 209, 116/210, DIG. 8, DIG. 9, 39; 248/160

(56) References Cited

U.S. PATENT DOCUMENTS

| | | | |
|---|---|---|---|
| 1,282,733 A | 10/1918 | Biondi | 116/39 |
| 1,285,940 A * | 11/1918 | Chodakowski | 343/880 |
| 1,292,790 A * | 1/1919 | Jackson | 116/39 |
| 1,343,761 A * | 6/1920 | Brendle | 116/41 |
| 1,448,728 A | 3/1923 | Clotworthy | |
| 1,452,114 A * | 4/1923 | Grenier | 116/39 |
| 1,469,806 A * | 10/1923 | Ohl | 116/39 |
| 1,675,298 A | 6/1928 | Kalies | |
| 1,685,330 A | 9/1928 | Maroney | 116/39 |
| 1,695,843 A | 12/1928 | Goff | 116/39 |
| 1,698,966 A * | 1/1929 | Quick | 246/473 R |
| 1,700,802 A | 2/1929 | Krecsy | |
| 1,745,372 A | 2/1930 | Knight | |
| 5,319,967 A * | 6/1994 | Rickards, Jr. | 73/170.06 |
| 5,402,591 A * | 4/1995 | Lee | 40/610 |
| 5,507,246 A * | 4/1996 | Rand, Jr. | 116/137 R |
| 5,826,535 A * | 10/1998 | Shaw | 116/173 |
| 6,234,105 B1 * | 5/2001 | Lamparter | 116/28 R |

FOREIGN PATENT DOCUMENTS

| | | | |
|---|---|---|---|
| GB | 373906 | * 6/1932 | 116/39 |

* cited by examiner

*Primary Examiner*—Diego Gutierrez
*Assistant Examiner*—R. Alexander Smith
(74) *Attorney, Agent, or Firm*—Bacon & Thomas, PLLC

(57) ABSTRACT

A flexible structural barrier is provided which is capable of yielding upon application of excessive force and immediately recovering to a rigid state with removal of the force, without either sustaining damage or imparting damage to the source of the force. The flexible structural barrier is made of a flexible material arranged to form a generally tubular structure when an appropriate air flow is establish therethrough. The flexible structural barrier is normally in a retracted or collapsed condition and is extended to an extended condition by the appropriate air flow, either automatically or upon demand. The barrier preferably includes an air flow source which is connected in fluid communication with the flexible material and is adapted to establish the appropriate air flow through the flexible material. The barrier may further include a return mechanism which is arranged to retract the flexible material from the extended condition to the retracted or collapsed condition when the air flow is stopped or not established. Although the barrier has many other applications, it is especially adapted for use in connection with a school bus to deter vehicles from passing the bus when stopped to load or unload students. The barrier is also especially adapted for use in connection with a semi-tractor trailer to deter vehicles from entering the swing-space when the semi-tractor trailer is turning.

19 Claims, 8 Drawing Sheets

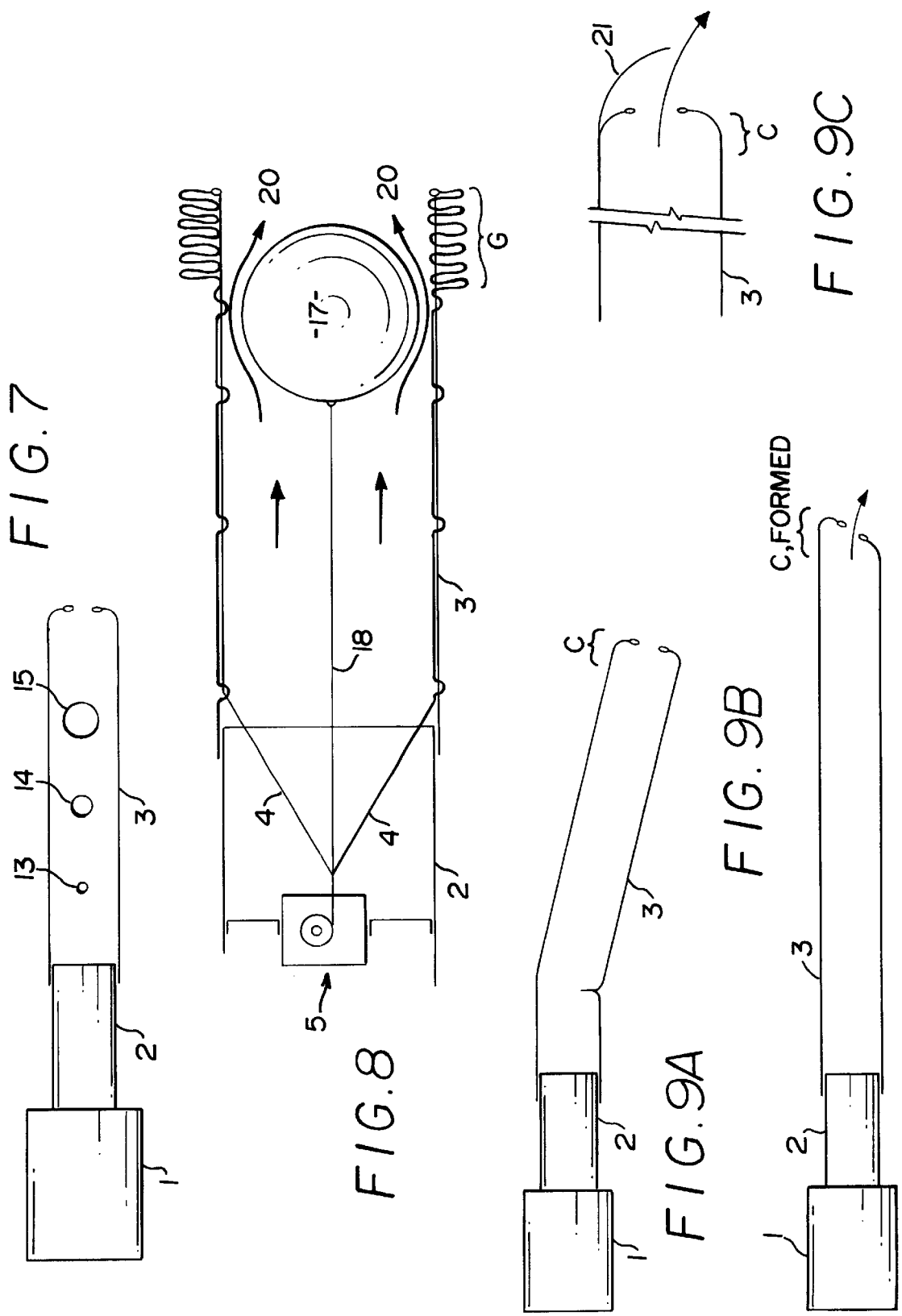

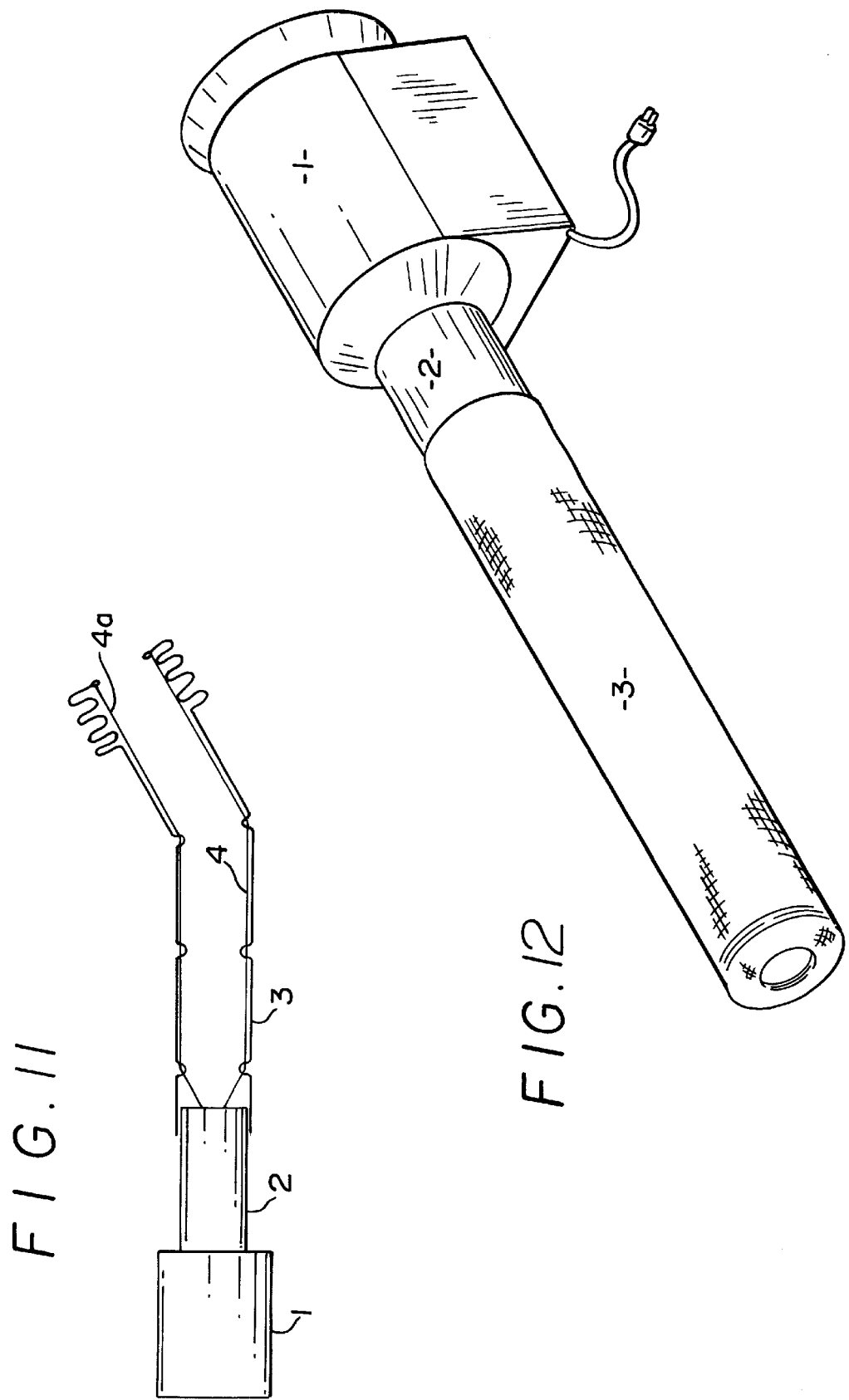

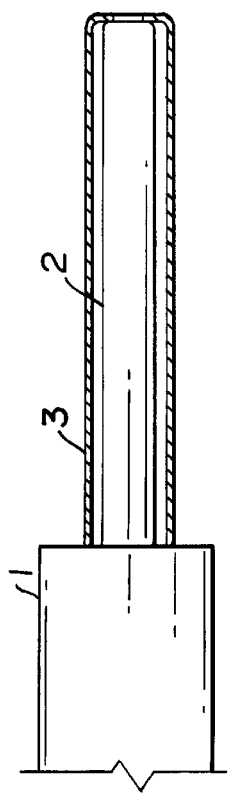
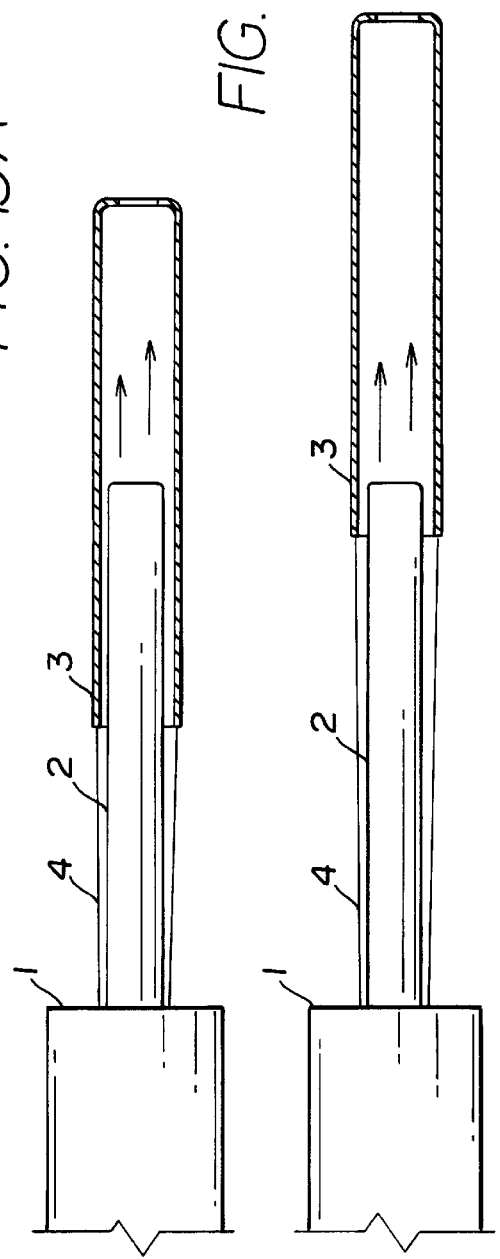
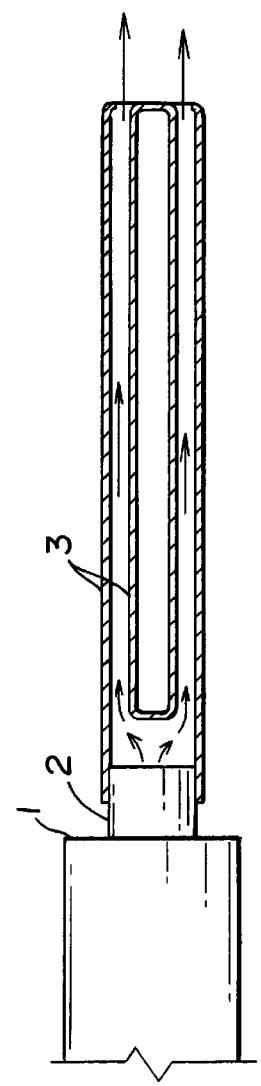
FIG. 15A  FIG. 15B  FIG. 15C  FIG. 16

FLEXIBLE STRUCTURAL BARRIER

This application claims the benefit of provisional application No. 60/150,095 filed Oct. 21, 1998.

BACKGROUND OF THE INVENTION

1. Field of Invention

The present invention relates to the field of lightweight structural barriers, and in particular barriers that are compact in a normal state and are extendable to several times the normal state automatically, or upon demand, to provide a visible and structural barrier for a variety of useful purposes. More particularly, the present invention relates to barriers that are deployed and maintained in an active rigid state, will yield when subjected to an excessive force and will immediately recover to the rigid state upon removal of the force, without either sustaining damage or imparting damage to the source of the force.

2. Description of the Related Art

Presently, flexible barriers are a compromise between structural rigidity, mass, size and effectiveness. Deployed by traditional means, these barriers may be structurally rigid but not yield sufficiently upon excessive force to prevent self-destruction, or to avoid imparting damage to the source of the force. Conversely, some flexible barriers may be sufficiently flexible to avoid sustaining damage from an excessive force applied thereto or damaging a source of a contacting force, but are not self-supporting or adequately effective. Such known flexible barriers are not satisfactory for many applications.

Although not related to flexible barriers based upon known techniques and applications, two particular situations exist which have not been satisfactorily resolved by the prior art. The first situation relates to safety in the operation of a school bus. It is well known that school children are exposed to great risk of being struck by a moving vehicle when boarding or disembarking from a school bus. The traditional solution has been to employ a warning system when a school bus is stopped to load or unload passengers. The warning system typically includes flashing lights and a suggestive stop sign. Such warning systems, however, have not proven entirely effective in alerting other drivers and keeping them from passing a stopped school bus that is boarding or discharging passengers, even with the threat of criminal prosecution for violating the law prohibiting such passing, resulting in avoidable risk of injury and death to children boarding or disembarking from the school bus.

The second situation relates to safety in the operation of a semi-tractor trailer combination rig, or similarly long vehicles. Such vehicles have a larger turning radius than most vehicles and thus require a "swing-space" for performing a right-hand turn. Typically, a prominent, graphic warning is displayed on the rear of such vehicles to alert other vehicles that they should not enter the swing-space when the vehicle is performing a right-hand turn. Again, the warning has not proven entirely effective in alerting other drivers and keeping them from entering the swing-space resulting in numerous, avoidable accidents.

The inventors are aware of several air pressure actuated signals useful for indicating an intention of a vehicle operator to change direction (e.g., turn, switch lanes). While these known signals appear to be related to the present invention, such signals do not contemplate solutions to the above-mentioned situations, but merely provide a visual indication of an intention to change direction. Moreover, such signals do not provide an actual structural barrier and have various drawbacks.

The known devices are presumably designed to stop vehicular traffic in these situations, but only provide visual warnings which are insufficient in practice. The known devices are at best suggestive and are not realistically intended to, and therefore do not, create a barrier to the passage of vehicles. Therefore, a need exists to provide an actual barrier to deter other vehicles from passing a stopped school bus and entering the swing-space of a long vehicle.

SUMMARY OF THE INVENTION

It is an object of the present invention to present a highly visible, rigid structure that is an undeniable barrier to the passage of vehicular traffic attempting to pass a stopped school bus that is boarding or discharging passengers and is displaying the traditional, suggestive, flashing lights and stop sign. Likewise, it is a further object of the invention to provide a similar undeniable barrier to common vehicular traffic that disregards the graphic warning displayed on the rear of the trailer of a semi-tractor trailer combination rig, or similarly long vehicles, and advances into the space to the right of such large vehicles, necessarily created as they prepare to negotiate a right hand turn. (Of course, right and left descriptions are reversed for countries where vehicles normally travel along roads to the left of center.)

The apparatus described herein is an improvement over existing types of lightweight barriers, and combines the advantageous characteristics of rigidity, flexibility, and extendibility. The structure of the present invention is lightweight, self-supporting, damage resistant, non-damaging, compact in the normal state, and of simple, economical construction and operation.

The novel design of this invention, uniquely combines rigidity, extendibility, flexibility, visibility, and is lightweight, scaleable, self-supporting, damage resistant, non-damaging, compact in the normal state, and is of simple, economical construction, and operation. This invention represents an unquestionable application of new art that necessarily improves safety in the applications described, and presents a wealth of new application opportunities in the areas of amusement, entertainment, industry and others. This invention comprises a device that can be activated automatically, or upon demand, by simple, cost effective means, presents an indisputable, self-supporting structural barrier, can tolerate abuse and assume little or no harmful effects, is non-damaging, constructed of common materials, and is easily integrated into a variety of applications. For these reasons and more, this invention clearly demonstrates improvements over the current state of the art of lightweight barriers.

The present invention contemplates a flexible structural barrier which is made of a flexible material arranged to form a generally tubular collapsible structure when an appropriate air flow is establish therethrough. The flexible structural barrier is normally in a collapsed condition and is extended to an extended condition by the appropriate air flow, either automatically or upon demand. The invention may include an air flow source which is connected in fluid communication with the flexible material and is adapted to establish the appropriate air flow through the flexible material. The invention may also include a return mechanism which is arranged to retract the flexible material from the extended condition to the collapsed condition when the air flow is stopped or not established.

BRIEF DESCRIPTION OF THE DRAWINGS

Other features and advantages of the present invention will become apparent upon a review of the following detailed description of several preferred embodiments of the invention, with reference to the attached drawings, in which:

FIG. 7 is a cross-sectional view of an embodiment including intentional air leaks which control the air flow and resulting pressure gradients;

FIG. 8 is a cross-sectional view of a portion of another embodiment including an airflow restrictor and attached tether;

FIG. 9A is a cross-sectional view showing the effects of an excessively high ratio of length to cross-section of the generally tubular collapsible structure when the invention is mounted in a horizontal attitude;

FIG. 9B is a cross-sectional view of an embodiment designed to produce counteracting forces to overcome the problem shown in FIG. 9A;

FIG. 9C is a cross-sectional view of a portion showing an alternative embodiment designed to overcome the problem shown in FIG. 9A;

FIG. 11 is a cross-sectional view which illustrates preferential manipulation of the draw cords to affect the orientation or shape of the flexible barrier;

FIG. 12 is a perspective view of a preferred embodiment of the invention with the flexible material extended to form the generally tubular collapsible structure;

FIGS. 15A, B, and C are cross-sectional views which illustrate various stages of the retraction of the flexible barrier according to another embodiment of the present invention; and FIG. 16 is a cross-sectional view which illustrates the flexible barrier in the extended condition according to another embodiment of the present invention.

DETAILED DESCRIPTION OF THE PREFERRED EMBODIMENTS

The subject invention is a self-contained, compact, pneumatically actuated, extendible flexible barrier that automatically extends and retracts in response to the application and removal or stoppage of fluid flow, in particular air flow. Initially intended to provide an on demand apparatus for stopping passing vehicular traffic when a school bus is boarding or discharging passengers, the present invention has a wide variety of applications as an extendible, damage resistant, non-damage inducing, soft/flexible structural barrier, and a profusion of other applications including the delivery of conditioned air or fluid, directional signal, amusements, mechanical actuator, and more.

Figure 1:
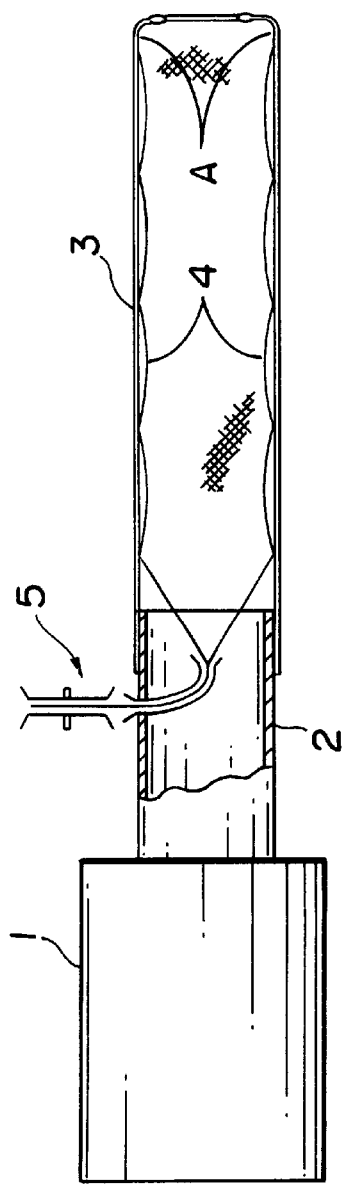
FIG. 1 is a cross-sectional view of a preferred embodiment of the invention showing the major components thereof.

Referring to the drawings, and in particular FIG. 1, the invention preferably includes an air flow source (1) that is able to supply adequate flow which can create pressure gradients above the ambient pressure for the apparatus. A mounting tube (2) or similar conduit may be directly associated with the air flow source to collect and channel the air flow therefrom. According to the invention, the flexible structural barrier is a generally tubular extendable/collapsible structure (3) comprised of a flexible fabric or semi-permeable or impermeable tube, or tubes, of a desired length, similar in diameter to the mounting tube. The preferred fabric is Nylon, but other suitable fabrics may be used. However, it is important to note that the flexible material that comprises the generally tubular collapsible structure should exhibit a quality of self-supporting stiffness when extended by the air flow from the air source and supported by the resulting pressure gradients, regardless of attitude.

The generally tubular collapsible structure (3) allows an air flow from the air flow source (1) to pass therethrough. In the case of an impermeable fabric or tube, at least two openings are provided to establish the air flow therethrough—one for communicating with the air flow source (1) via the mounting tube (2) at a proximal end and one for releasing the air flow to the atmosphere. In the case of a permeable fabric like Nylon or a permeable tube, it is not absolutely necessary to provide an additional opening for releasing the air flow to the atmosphere. The small holes or pores of the fabric or tube in that case would constitute the second "opening" required for passing the air flow through the generally tubular collapsible structure (3).

Because the generally tubular collapsible structure (3) is extended and supported by an air flow source rather than an air pressure source, a closed system does not have to be maintained. For example, if a small tear exists in the generally tubular collapsible structure (3) or a leak exists between the mounting tube (2) and the air flow source (1) or the generally tubular collapsible structure (3), the apparatus may still operate properly. Also, the apparatus is not subject to rupture due to over pressure or piercing (like a balloon). Further, if solely air pressure rather than an air flow is used to establish sufficient structural rigidity to support the generally tubular collapsible structure (3), the generally tubular collapsible structure (3) may not exhibit the desired flexibility in its extended condition to avoid causing damage upon impact.

The invention preferably includes a return mechanism which may comprise an integrated draw cord, or cords (4), and a retraction device such as a spring-loaded take-up reel (5), or any other passive or powered take up reel. Other devices or accessories, such as lighting, streamers, passive noisemakers, fluorescent powders, or microsphere markers, may be added to the invention to enhance the device's visibility, presence, amusement, or verification of contact with the barrier.

Figure 2:
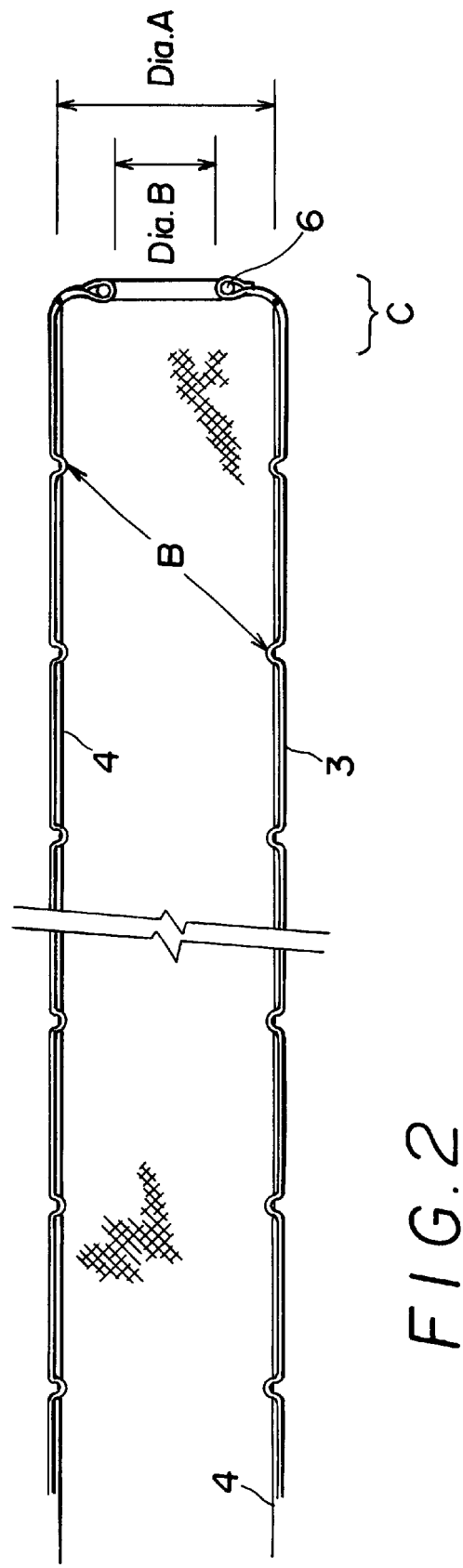
FIG. 2 is a cross-sectional view of the generally tubular collapsible structure, showing details of the unattached (distal) end and the draw cords according to a preferred embodiment.

In a preferred embodiment, one end (i.e., proximal end) of the mounting tube (2), usually round, is attached to the discharge of the air flow source (1). The other end (distal end) of the mounting tube (2) accepts one end (proximal) of the generally tubular collapsible structure (3) and fits tightly to its diameter. According to the embodiment shown, the plurality of draw cords (4), or any other flexible links, run from end to end along the inside surface within the generally tubular collapsible structure (3) and are generally equally spaced around the diameter of the generally tubular collapsible structure (3). The draw cords (4) are preferably anchored to the unattached end of the flexible barrier tube (at point A) and extend toward the mounting tube. Referring to FIG. 2, in particular, the draw cords (4) are slidingly in contact with the generally tubular collapsible structure (3) by periodic weaving (B) with the flexible material thereof, or by any means that will allow the draw cords to slide with respect to the flexible material.

A restriction device providing a variable terminal restriction to the air flow is preferably introduced at the unattached (distal) end (C) of the generally tubular collapsible structure (3), and is intended to act as a flow control valve for the regulation of the extension, retraction and structural rigidity of the generally tubular collapsible structure during operation of the apparatus. One example of such a restriction device which reduces the diameter of the distal end of the generally tubular collapsible structure (3) is a circumferential draw string (6), appropriately attached to the generally tubular collapsible structure (3). The draw string (6) adjusts the diametrical size (Dia. A) of the opening in the distal end to a smaller diametrical size (Dia. B.) and thus act as a simple, terminal flow restrictor.

Figure 3A:
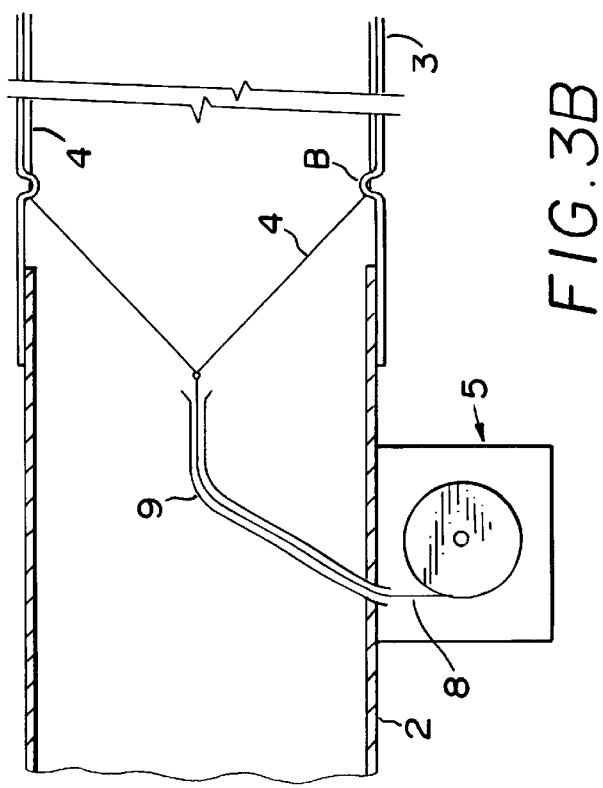
FIG. 3A is a cross-sectional view of a portion including the take-up reel/return mechanism and the draw cords according to another preferred embodiment.
Figure 3B:
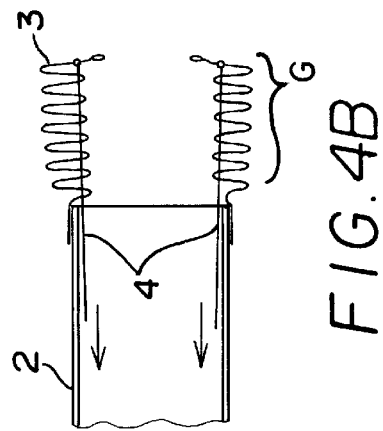
FIG. 3B is a cross-sectional view similar to FIG. 3A showing an alternative embodiment.

As shown in FIGS. 3A and 3B, a spring take-up reel (5), or other type of passive or powered take-up reel, is mounted to the inside or outside of the mounting tube (2) with the free end of an appropriate type and length of cable or cord (8) extending from the take-up reel (5). If the take-up reel is mounted internally to the mounting tube (2), as shown in FIG. 3A, the draw cords (4) are connected to the cable or cord that extends from the take-up reel. If the take-up reel is mounted external to the mounting tube (2), as shown in FIG. 3B, the draw cords (4) must first exit the mounting tube by an appropriate means (9) and then connect to the cable or cord (8) that extends from the take-up reel.

Figure 4A:
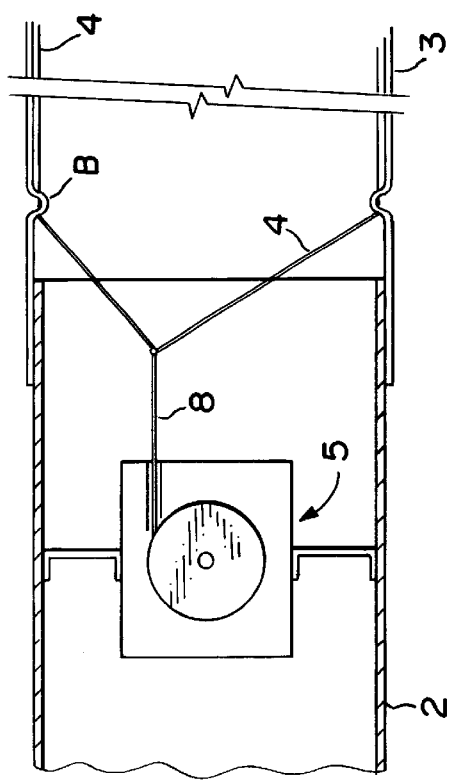
FIG. 4A is a cross-sectional view of a preferred embodiment of the invention showing details of an alternative integration of the draw cords and the generally tubular collapsible structure.
Figure 4B:
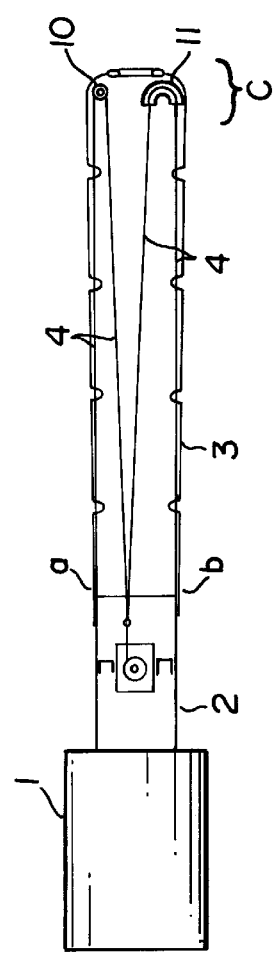
FIG. 4B is a cross-sectional view of a portion showing the flexible material at rest, in the fully retracted, collapsed condition.
Figure 5A:
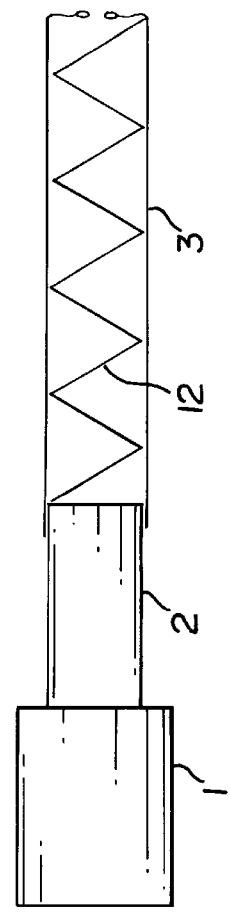
FIG. 5A is a cross-sectional view of an embodiment including an alternative return mechanism comprising a helical coil spring, shown with the flexible material in the collapsed condition.
Figure 5B:
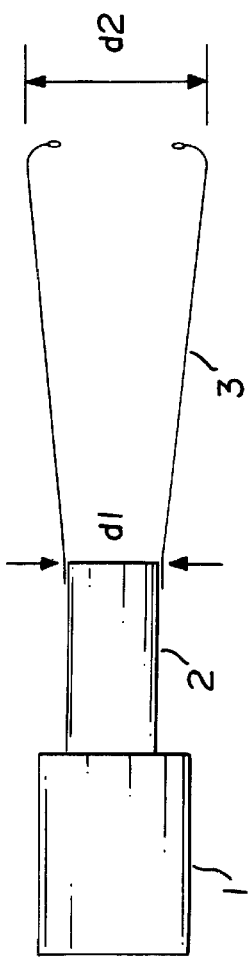
FIG. 5B is a cross-sectional view of the embodiment of FIG. 5A, shown with the flexible material extended to form the generally tubular collapsible structure.

It is noted that other draw cord integration schemes, and other means of restricting, or otherwise controlling the flow and pressure gradients within the generally tubular collapsible structure may be employed. For instance, FIG. 4A illustrates that draw cords (4) may be anchored to the generally tubular collapsible structure (3) near the mounting tube (2), at a point (a), or anchored to the mounting tube (2) itself, at point (b), and run through the generally tubular collapsible structure (3), as described above, to the distal end (C). In this configuration, the draw cords (4) are then redirected back towards the mounting tube (2) by small pulleys (10) or U-shaped members (slides) (11), which are appropriately mounted at the distal end (C). The draw cords (4) make their way freely, through the generally tubular collapsible structure (3) and are then connected to the take-up reel (5) as described earlier. Other means of integrating the draw cords with the flexible barrier tube that allow the flexible barrier tube (3) to gather (G), as shown in FIG. 4B, as the draw cords are retracted, are acceptable as well. FIGS. 5A and 5B show yet another possible return mechanism for the generally tubular collapsible structure (3) in the form of a helical spring (12) or the like having an appropriate resilient force to maintain the generally tubular collapsible structure (3) in a retracted/collapsed condition when the apparatus is at rest, as shown in FIG. 5A, while allowing the generally tubular collapsible structure (3) to extend, as shown in FIG. 5B, upon actuation of the air flow source (1).

Yet another return mechanism that may be employed is the air flow source itself by the application of a sudden and forceful reversal of the air flow therefrom. While this may be employed for other embodiments, this is particularly the case when the mounting tube (2) is substantially the same length as the generally tubular collapsible structure (3) as shown in FIGS. 15A, 15B and 15C. This embodiment is for use when compactness is not a design concern. The draw cords (4) themselves may be retracted with any suitable mechanism such as those described above. In this embodiment, no gathering of the material of the generally tubular collapsible structure (3) is required and the collapsible nature merely enhances the flexibility of the extended structure.

It will be evident from FIGS. 15A, 15B and 15C, showing the generally tubular collapsible structure (3) in its extended through retracted positions, that the draw cords (4) need only be required to retain the generally tubular collapsible structure (3) relative to the mounting tube (2) and the air flow source (1). If the draw cords (4) are omitted, then the apparatus may be used for amusement purposes since the generally tubular collapsible structure (3) will become a soft, fun projectile upon activation of the air flow source (1).

Figure 6A:
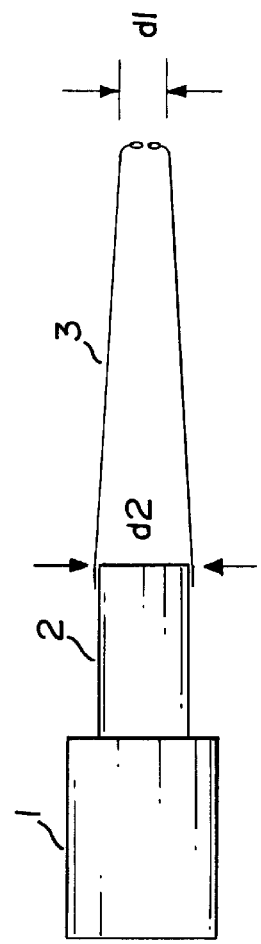
FIGS. 6A and 6B are cross-sectional views of alternative embodiments having generally tubular collapsible structures of different shapes that present increasing and decreasing cross-sectional areas, respectively, and control the air flow and resulting pressure gradients within the generally tubular collapsible structures.
Figure 6B:
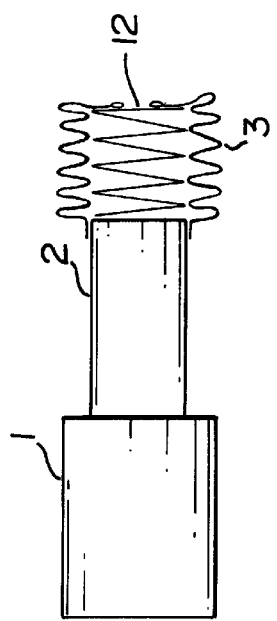

With respect to controlling the air flow and resulting pressure within the generally tubular collapsible structure, it may be desirable to maintain a gradient of air pressures which favor higher pressures nearest the mounting tube at times to keep the generally tubular collapsible structure proportionally more rigid, especially when retracting the generally tubular collapsible structure. For instance, FIG. 6A illustrates a slightly conical generally tubular collapsible structure (3) arranged with a smaller diameter opening (d1) connected to the mounting tube (2) and a larger diameter opening (d2) at the distal end (C). This increasing cross-sectional area of the generally tubular collapsible structure (3) will consistently provide the desired pressure gradients by virtue of the relationship of air flow and volume, regardless of the state of extension or retraction of the generally tubular collapsible structure (3). In some cases, depending on the ratio of length vs. diameter of the generally tubular collapsible structure, this configuration may be favored over a generally tubular collapsible structure (3) of uniform diameter. In other cases, a generally tubular collapsible structure (3) of uniform diameter, or even a generally tubular collapsible structure (3) with a slight conical shape, with the large diameter (d2) connected to the mounting tube (2), as shown in FIG. 6B, may be preferred. Yet another way to maintain desired pressure gradients is to install intentional air leaks in the generally tubular collapsible structure (3), of increasing or decreasing magnitude as the distance from the mounting tube changes. For instance, FIG. 7 illustrates a series of holes (13, 14 and 15, respectively), cut into the generally tubular collapsible structure (3), which increase in diameter as the distance from the mounting tube changes that will provide the desired pressure gradients. A final example of favorably controlling the pressure gradients within the generally tubular collapsible structure (3) is accomplished using an internal, moving restrictor that generally follows a leading edge of the gathered flexible material. The restrictor may be coupled to the draw cord take-up reel or an independent take-up reel, by a suitable cable or cord. FIG. 8 illustrates such a restrictor as a lightweight ball (17) of a diameter slightly smaller than the diameter of the generally tubular collapsible structure (3) and freely tethered to the existing draw cord take-up reel (5) by a cord (18). The ball (17) is tethered appropriately to stay slightly behind the leading edge of the gathering (G) of the flexible material as the flexible material extends and retracts, and necessarily maintains a centered position within the generally tubular collapsible structure (3) in response to the Bernoulli Effect of the flowing air (20, arrows). This ball (17) restricts the flow of air adequately to provide the desired pressure gradient.

In certain cases, it is desirable to direct the discharge of air flow from the distal end of the generally tubular collapsible structure slightly off the longitudinal axis thereof For example, when the ratio of the length vs. the diameter of the generally tubular collapsible structure increases and the generally tubular collapsible structure is positioned horizontal when extended, there may be a tendency for the generally tubular collapsible structure to have insufficient structural rigidity to be fully self-supporting and thus may buckle downward as shown in FIG. 9A. This is especially true when air flow and the resulting pressure gradients are inadequate. In this case, as shown in FIG. 9B, directing the exiting flow of air slightly downward (arrow) by purposely forming the distal end (C, formed) of the generally tubular collapsible structure (3), or adding a directional device (21), shown in FIG. 9C, to the distal end (C) of the generally tubular collapsible structure (3) that directs the exiting air flow downward (arrow), will cause a lifting effect and restore the structural rigidity of the extended or partially retracted generally tubular collapsible structure.

Figure 10B:
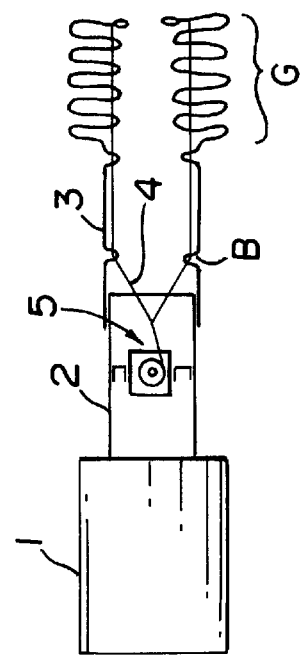
FIGS. 10A, B, C and D are cross-sectional views which illustrate various stages of the extension and retraction of the flexible barrier according to the present invention.
Figure 10D:
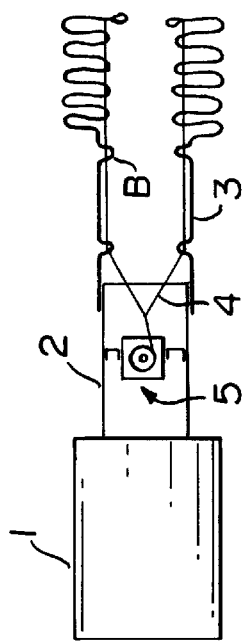
Figure 10A:
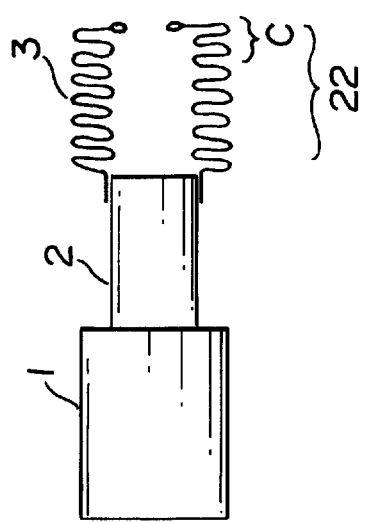
Figure 10C:
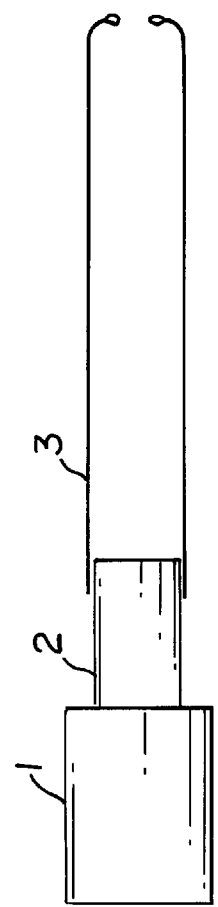

Typical operation of a preferred embodiment of the invention begins with the device at rest, shown in FIG. 10A. The flexible material of the generally tubular collapsible structure (3) may preferably be a lightweight, tightly woven Nylon fabric material form as a tube with openings at each end. Here, the opening of the distal end (C) is slightly reduced in diameter to provide a modest terminal flow restriction. The Nylon fabric material is in a fully retracted (gathered) configuration (22) near the connection of the generally tubular collapsible structure (3) and the mounting tube (2). Upon application of the appropriate airflow (arrow) from the airflow source (1), the Nylon material begins to extend from the mounting tube (2), as shown in FIG. 10B, and un-gathers to form the generally tubular collapsible structure (3) as shown in FIG. 12. Preferably smooth, Nylon monofilament draw cords (4) are pulled through attachments to the Nylon material (see also FIG. 2, designation B) as the force of the air flow overcomes the retracting force of the take-up reel (5) and the leading edge of the Nylon material extends away from the mounting tube (2). The Nylon material is maintained in an extended, rigid condition forming the generally tubular collapsible structure (3), as shown in FIG. 10C, until the air flow is terminated, at which time the force of the take-up reel (5) overcomes the force of the diminishing air pressure and the Nylon material begins to gather (G) and retract, as shown in FIG. 10D. It is noted that removal of air flow is not necessary to allow the flexible material to retract if a powered take-up reel is employed which exerts a retracting force in excess of the extending force of the air flow.

It is understood that under some circumstances, the intuitive operation of the invention is not necessarily the desired operation. For instance, preferentially controlling some (4a), but not all of the draw cords (4), as illustrated in FIG. 11, causes the generally tubular collapsible structure (3) to bend when fully or partially extended. In some cases, especially with amusement applications, this may indeed be the preferred mode of operation. Another example of apparently non-ideal operation is the effect of eliminating the terminal flow restriction at the distal end of the generally tubular collapsible structure which results in chaotic whipping movements of the generally tubular collapsible structure upon application of the air flow, much like an open, unattended fire hose. For applications where increased visibility, amusement, random placement of the discharge air, and audible recognition of the tube are desired, this configuration may be the desired embodiment.

Figure 13:
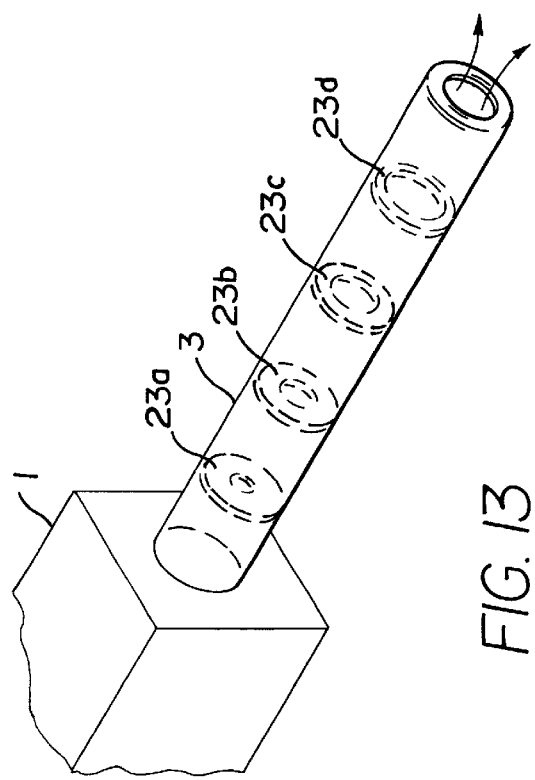
FIG. 13 is a perspective view of a preferred embodiment of the invention with the flexible material provided with internal baffles.

In some cases, it may be necessary to include a baffle, or series of baffles within the generally tubular collapsible structure in order to create pressure gradients that will help the structure maintain its structural shape while extending and retracting. An exemplary embodiment is shown in FIG. 13 in which a series of baffles (23a–d). The desired effect is to maintain a zone of relative higher pressure within the structure at its connection to the mounting tube as compared to the distal portion of the structure. This desired dynamic rigidity may also be accomplished by using a flexible material that has a variable stiffness, or weave density, so as to create a generally tubular collapsible structure that is slightly more rigid at the end nearest the mounting tube as compared to the distal portion.

Figure 14C:
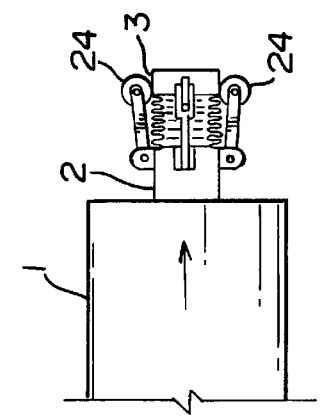
FIGS. 14A, B, and C are cross-sectional views which illustrate various stages of the retraction of the flexible barrier according to an embodiment of the present invention including "feed dog" wheels, FIG. 14A showing the extension of the flexible barrier for this embodiment.
Figure 14A:
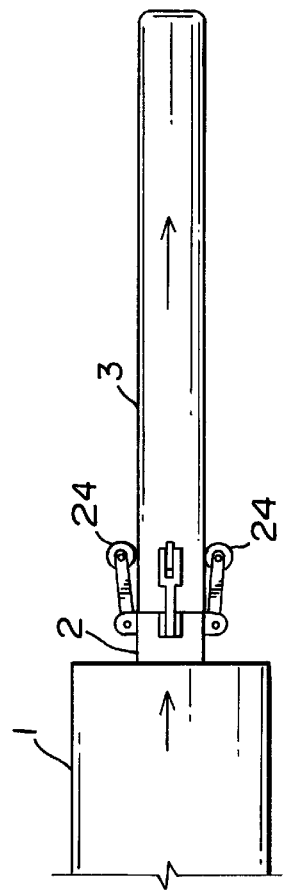
Figure 14B:
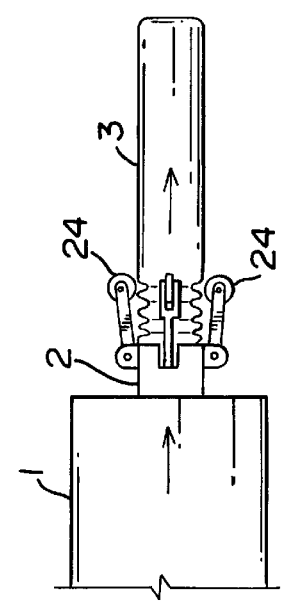

It is also possible to extend and retract the flexible tube (3) using several powered wheels (24) located around the circumference, and near the end, of the mounting tube (2) with the contact plane(s) of the wheels (24) parallel to the cylindrical axis of the mounting tube (2) as in the embodiment shown in FIGS. 14A, 14B and 14C. These "feed dog" wheels (24) preferably have a rubber-like tread and press against the mounting tube (2) with sufficient force to hold the flexible material between the wheels (24) and the mounting tube (2). Upon activation, and in the case of retracting the flexible tube (3), the wheels (24) would pinch and "gather" the flexible material upon the mounting tube (2), as shown in FIG. 14B, to a fully collapsed condition or "gathered" state, as shown in FIG. 14C. This may be even be accomplished while the flexible tube (3) is still subjected to the air flow therethrough. Extending the tube (3) from the "gathered" state may be accomplished by applying the air source (1) and "freewheeling" or reversing the motion of the wheels (24), or releasing the pinching engagement of the wheels (24) and the flexible tube (3) as illustrated in FIG. 14A, and allowing the flexible tube (3) to extend as usual.

FIG. 16 shows yet another embodiment of the apparatus. In this embodiment, the generally tubular collapsible structure (3) comprises a set of coaxial tubes which are arranged to allow an air flow therebetween as illustrated by arrows.

The generally tubular collapsible structure (3) may be mounted on the mounting tube (2) with draw cords (4) (not shown), as in the previously discussed embodiments, or one or both of the coaxial tubes may be directly connected to the mounting tube (2) or more directly to the air flow source (1). This embodiment may be particularly advantageous since the air flow is channeled and restricted to provide a more rigid structure for a given amount of air flow.

Having thus described the invention with particular reference to the preferred embodiments thereof, it will be understood that various changes and modifications may be made therein without departing from the spirit and scope of the invention as defined in the claims which follow.

In particular, the air flow source may be any convenient source that can deliver air at an adequate flow rate such that resulting air pressure gradients are slightly to moderately above the ambient pressure. For example, the adequate flow rate may be similar to the flow and pressure one might obtain from an ordinary household fan, or to the discharge of a household vacuum cleaner, where flow is the predominant effect rather than pressure. Contrary to this, it is less desirable to have a pressure source, that is, one where high pressure is the predominant effect and flow is relatively low, such as an air pump for inflating automobile tires. However, it is possible that there may be applications where the construction of the invention and/or the desired effect of the invention may require a source in which the different effects of pressure and flow are not as extreme as the preferred source. Therefore, preferably, an axial fan is utilized for it's inherent qualities: production of high flow rates, compactness and compatible design by virtue of a shape that is consistent with the predominantly longitudinal, cylindrical construction of the invention. However, fans of other construction such as a squirrel cage fan, or even a ram induction design, that can provide the right conditions of flow and resulting pressure gradients may be suitable sources for the invention.

In all cases, the sources of air may themselves be powered by any suitable energy source, such as the battery or alternator of an automobile providing electrical power, or even household electrical power (see FIG. 12), if that source is suitable and convenient. Gasoline powered mechanical air sources may also be suitable in some cases, as well as existing sources of compressed air, such as the supply of air for truck brakes, providing that the high pressure source can adequately be converted to a high flow source.

The attachment of the air source to the invention is not critical as long as the attachment conduit does not unduly obstruct or restrict the air flow or cause unnecessary turbulence in the air stream. It is not essential that the fan be mounted near the flexible material as long as the conduit between the source and the invention is not so long as to restrict the appropriate flow of air. However, common sense would suggest that a source of air power in close proximity to the flexible material would present an efficiently and conveniently compactly packaged product.

The specific intended applications, described previously, are as an extending barrier for school bus safety and tractor-trailer safety. In the case of a school bus, the invention is preferably mounted on the floor, just behind the diver's seat and extends outside the bus through an appropriate opening when activated. At this elevation, the extended flexible barrier will be at windshield height for most vehicles and directly visible to the drivers of those vehicles. In the case of a tractor-trailer truck, or similarly long vehicle, the invention is preferably mounted on the outside, or inside, on the deck of the trailer/vehicle behind the last set of rear wheels, extending out at a right angle with respect to the longitudinal axis of the vehicle. Here too, the extended flexible barrier will be near eye-level for the driver of most vehicles. In all cases, the invention is preferably mounted at a convenient level so that it is clearly visible to the drivers of all types of motor vehicles.

We claim:

1. A flexible structural barrier mounted on a bus, the barrier comprising:

a flexible material being arranged to form a generally unitary, single piece tubular structure when an appropriate air flow is established therethrough, said tubular structure having an end open to the atmosphere to allow the continuous passage of air therethrough; and a mechanical air flow source arranged in fluid communication with the flexible material and adapted to establish the appropriate air flow therethrough such that the flexible material is linearly extended from a retracted condition to an extended condition;

wherein the flexible structural barrier is arranged such that the generally tubular structure extends linearly outwardly from an appropriate side of the bus when in the extended condition.

2. A flexible structural barrier according to claim 1, wherein the flexible material includes a marking substance which is released upon contact with the flexible structural barrier.

3. A flexible structural barrier according to claim 2, wherein the marking substance is not visible to the naked eye.

4. A flexible structural barrier according to claim 1, including a return mechanism arranged to retract the flexible material from an extended condition to a retracted condition;

said return mechanism comprising a plurality of draw cords slidingly connected to the flexible material along the length of the tubular structure and anchored at a distal end area of the tubular structure.

5. A flexible structural barrier mounted on an elongated vehicle requiring a swing-space for making a turn, the barrier comprising:

a flexible material being arranged to form a generally unitary, single piece tubular structure when an appropriate air flow is established therethrough, said tubular structure having an end open to the atmosphere to allow the continuous passage of air therethrough; and a mechanical air flow source arranged in fluid communication with the flexible material and adapted to establish the appropriate air flow therethrough such that the flexible material is linearly extended from a retracted condition to an extended condition;

wherein the flexible structural barrier is arranged on a rearward portion of the vehicle such that the generally tubular structure extends linearly outwardly, generally perpendicular to an appropriate side of the vehicle when in the extended condition.

6. A flexible structural barrier according to claim 5, including a return mechanism arranged to retract the flexible material from an extended condition to a retracted condition;

said return mechanism comprising a plurality of draw cords slidingly connected to the flexible material along the length of the tubular structure and anchored at a distal end area of the tubular structure.

7. A flexible structural barrier device, comprising:

a flexible material being arranged to form a generally unitary, single piece tubular structure when an appropriate air flow is established therethrough, said tubular structure having an end open to the atmosphere to allow the continuous passage of air therethrough; and a mechanical air flow source arranged in fluid communication with the flexible material and adapted to establish the appropriate air flow therethrough such that the flexible material is linearly extended from a retracted condition to an extended condition.

8. A flexible structural barrier device according to claim 7, further comprising:

a return mechanism arranged to retract the flexible material from the extended condition to the retracted condition;

said return mechanism comprising a plurality of draw cords slidingly connected to the flexible material along the length of the tubular structure and anchored at a distal end area of the tubular structure.

9. A flexible structural barrier device according to claim 8, wherein the air flow source is also adapted to provide a sudden reversed air flow such that the air flow source comprises the return mechanism.

10. A flexible structural barrier device according to claim 7, wherein the flexible material is arranged to form the generally tubular structure with an increasing cross-sectional area extending from a proximal to a distal end of the structure.

11. A flexible structural barrier device according to claim 7, wherein the flexible material is arranged to form the generally tubular structure with a decreasing cross-sectional area extending from a proximal to a distal end of the structure.

12. A flexible structural barrier device according to claim 7, further comprising:

a plurality of intentional air leaks of increasing size formed in the flexible material along the length of the generally tubular structure.

13. A flexible structural barrier device according to claim 7, further comprising:

a plurality of intentional air leaks of decreasing size formed in the flexible material along the length of the generally tubular structure.

14. A flexible structural barrier device according to claim 7, further comprising:

an internal restrictor which is disposed near a distal portion of the generally tubular structure such that it travels therewith when the flexible material is extended and retracted.

15. A flexible structural barrier device according to claim 1, wherein the internal restrictor is coupled to at least one draw cord.

16. A flexible structural barrier device according to claim 7, further comprising:

a directional device attached to a distal end of the generally tubular structure such that the air flow through the structure is directed away from a longitudinal axis of the structure upon exiting the structure.

17. A flexible structural barrier device according to claim 7, wherein the flexible material is formed at a distal end of the generally tubular structure such that the air flow through the structure is directed away from a longitudinal axis of the structure upon exiting the structure.

18. A flexible structural barrier device according to claim 7, wherein an opening is formed in the flexible material at a distal end of the generally tubular structure and wherein a restriction device is arranged about the opening which adjusts the size of the opening.

19. A flexible structural barrier device according to claim 18, wherein the restriction device comprises a draw string.

* * * * *